United States Patent [19]
Greimann et al.

[11] Patent Number: 5,139,200
[45] Date of Patent: Aug. 18, 1992

[54] SHIELD FOR AGRICULTURAL SPRAYER

[76] Inventors: Floyd D. Greimann, Rural Route 2, P.O. Box 143; Gordon L. Greimann, P.O. Box 483, both of Sheffield, Iowa 50475

[21] Appl. No.: 685,925

[22] Filed: Apr. 16, 1991

[51] Int. Cl.⁵ .............................................. B05B 1/28
[52] U.S. Cl. .................................. 239/288.3; 239/169
[58] Field of Search .......................... 239/163-169, 239/172, 175, 176, 104, 288-288.5, 587, 588

[56] References Cited

U.S. PATENT DOCUMENTS

| | | | |
|---|---|---|---|
| 2,581,678 | 1/1952 | Malin et al. | 239/104 |
| 2,589,020 | 3/1952 | North, Jr. | 239/104 |
| 2,663,973 | 12/1953 | White | 239/288 |
| 2,740,664 | 4/1956 | Yates | 239/172 |
| 2,928,610 | 3/1960 | Fenimore | 239/288.5 |
| 3,118,607 | 1/1964 | Rocher | 239/288.3 |
| 3,445,961 | 5/1969 | Elsworth | 239/288 |
| 3,544,011 | 12/1970 | Van der Lely | 239/176 |
| 3,565,341 | 2/1971 | Burroughs | 239/175 |
| 4,199,896 | 4/1980 | Lehman | 239/288.5 |
| 4,274,589 | 6/1981 | Jones | 239/167 |
| 4,641,781 | 2/1987 | McCrea et al. | 239/288.5 |
| 4,646,971 | 3/1987 | Rogers | 239/166 |
| 4,865,257 | 9/1989 | Bailey | 239/288.5 |
| 4,947,581 | 8/1990 | Claussen et al. | 239/175 |
| 4,986,473 | 1/1991 | Semple et al. | 239/104 |

FOREIGN PATENT DOCUMENTS 2608944 7/1988 France ............................ 239/288

Primary Examiner—Andres Kashnikow
Assistant Examiner—Karen B. Merritt
Attorney, Agent, or Firm—Zarley, McKee, Thomte, Voorhees & Sease

[57] ABSTRACT

A shield is provided for housing a single sprayer head of an agricultural sprayer assembly. The shield is pivotally and adjustably mounted upon a vertically oriented post connected to the agricultural frame. The shield is conically or pyramidly shaped, having an ever-increasing cross sectional area from top to bottom. The sprayer head is oriented within the shield such that the spray band coordinates with the major axis of the shield. A removable door is provided on the shield to provide quick and easy access to the sprayer head for cleaning and maintenance purposes.

19 Claims, 2 Drawing Sheets

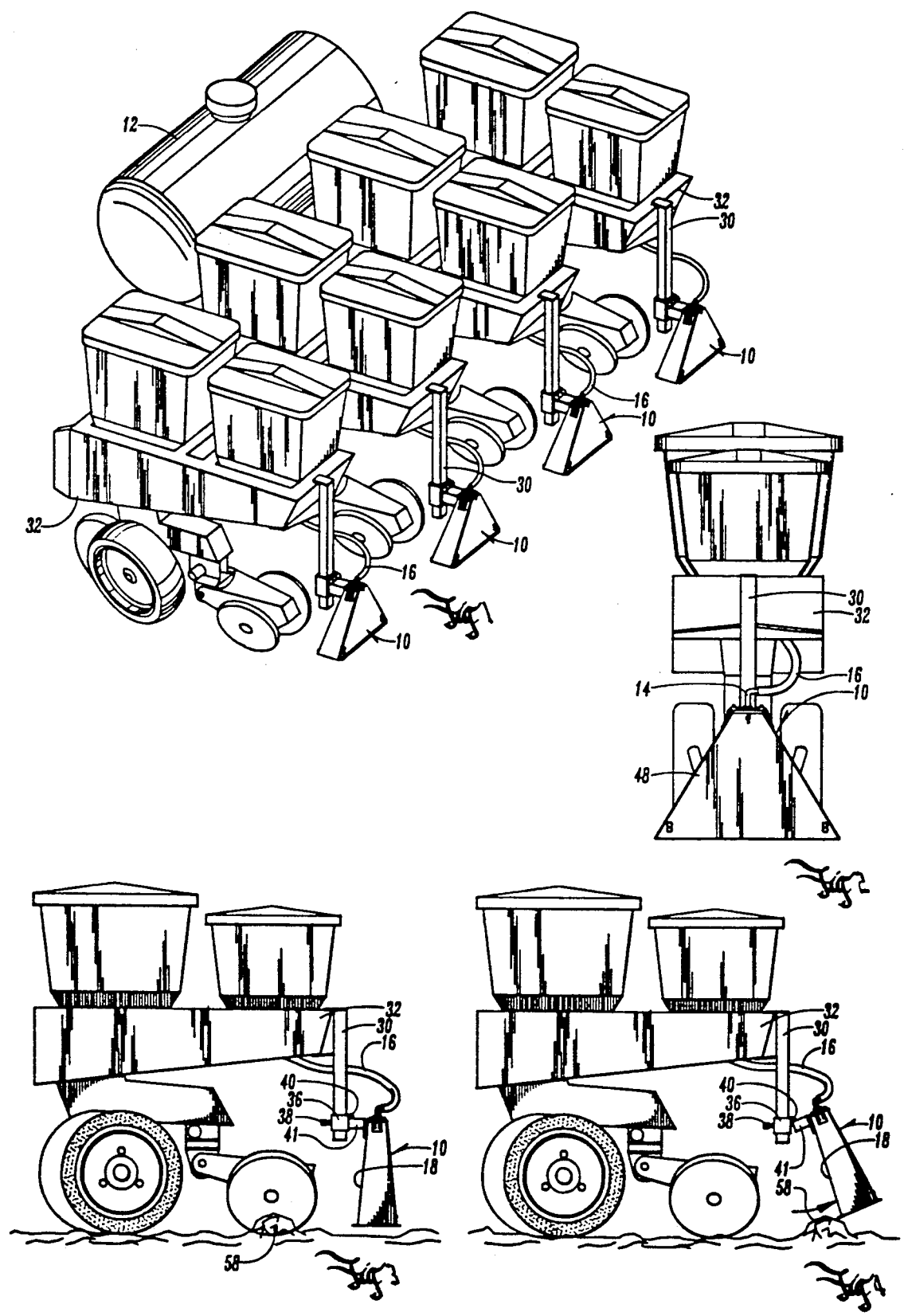

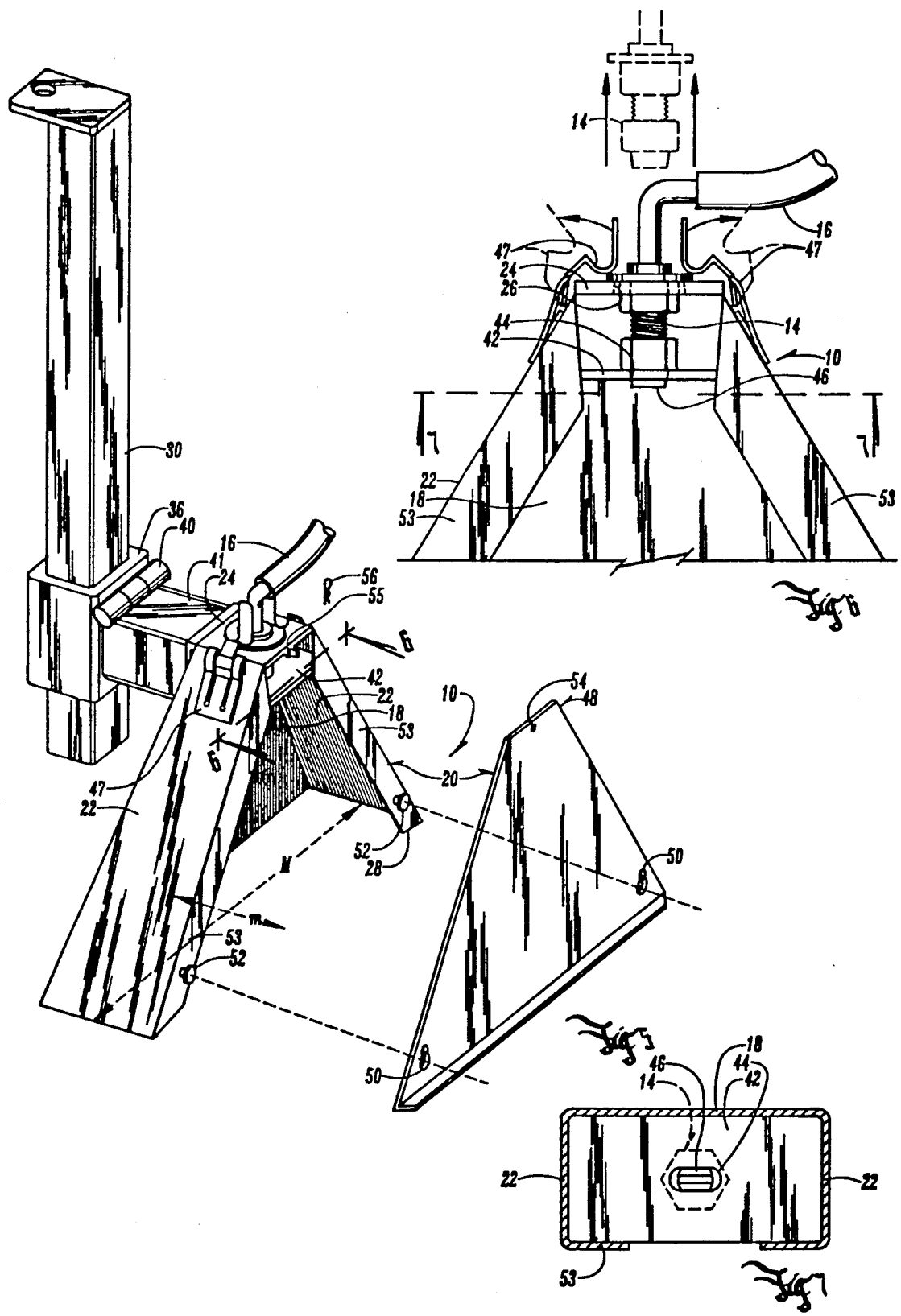

SHIELD FOR AGRICULTURAL SPRAYER

BACKGROUND OF THE INVENTION

Shields for agricultural sprayers are well known. Generally, there are two types of shields: a large elongated shield housing a plurality of sprayer heads, and smaller individual shields within which a single sprayer head is mounted. The large shield typically spans the entire width of the sprayer assembly, and therefore is bulky and difficult to install. Also, when problems develop with the sprayer, it is difficult to detach the large shield to clean or repair a sprayer head. Such time consuming assembly and disassembly of the large shield increase the operative costs of spraying. Also, such large shields are more costly to purchase, require more than one person to attach and detach to the agricultural frame, and require significant storage space.

The smaller shields for housing individual sprayer heads are easier to install and are less expensive than the large shields. However, some problems still remain. For example, both the large and small shield typically are spaced above the ground a significant distance to avoid obstacles or uneven ground surfaces. Therefore, even with these shields, spraying must be done on relatively calm days so that wind does not carry the herbicide beyond the desired application zone in the field. Also, even with the smaller shields, if a problem develops in the sprayer head, the entire shield must be removed to repair or clean the head.

Accordingly, a primary objective of the present invention is the provision of an improved sprayer shield for an agricultural sprayer assembly.

A further objective of the present invention is the provision of a sprayer shield which can be spaced closely adjacent the ground so as to allow spraying on windy days by minimizing or eliminating the effects of wind upon the sprayed herbicide.

Another objective of the present invention is the provision of a sprayer shield which is pivotally mounted upon an agricultural frame.

A further objective of the present invention is the provision of a sprayer shield having a removable door for quick and easy access to the sprayer head.

Yet another objective of the present invention is the provision of a sprayer shield for an agricultural sprayer assembly which houses and orients a sprayer head so as to produce the desired spray pattern.

Another objective of the present invention is the provision of a sprayer shield in which a sprayer head is releasably mounted.

Still another objective of the present invention is the provision of a sprayer shield which is vertically adjustable on the agricultural frame relative to the ground.

A further objective of the present invention is the provision of a sprayer shield which is economical to manufacture, easy to install, and durable in use.

These and other objectives will become apparent from the following description of the invention.

SUMMARY OF THE INVENTION

The sprayer shield of the present invention includes interconnected sides, a substantially closed top, and an open bottom. The shield is pivotally and adjustably mounted upon a vertically oriented post connected to an agricultural frame such that the lower edge of the shield is spaced closely to the ground. A sprayer head extends through the top of the shield and is releasably held in position by a mounting plate fixed within the shield and by releasable clips. The shield also includes a removable door so as to provide quick and easy access to the sprayer head for cleaning and maintenance.

In use, the sprayer shield is mounted on the post and the sprayer head is secured in position in the shield. The vertical height of the shield above the ground is adjusted, but preferably, clearance above the ground is only one to two inches so as to minimize or eliminate the effects of wind during spraying operations. If the shield encounters an obstacle or uneven terrain as the tractor or prime mover pulls the sprayer assembly forwardly, the shield pivots rearwardly and upwardly over the obstacle, and then returns to its normal position spaced closely to the ground. Thus, damage to the shield is prevented.

BRIEF DESCRIPTION OF THE DRAWINGS

FIG. 1 is a perspective view showing a plurality of shields of the present invention as mounted on an agricultural planter and sprayer assembly.

FIG. 2 is a rear elevation view of a shield of the present invention.

FIG. 3 is a side elevation view of a shield in its normal operative position.

FIG. 4 is a view similar to FIG. 3 showing the shield pivoted rearwardly and upwardly to bypass an obstacle.

FIG. 5 is an exploded perspective view of a shield of the present invention.

FIG. 6 is a partial view of the shield taken along lines 6—6 of FIG. 5.

FIG. 7 is a sectional view taken along lines 7—7 of FIG. 6.

DETAILED DESCRIPTION OF THE PREFERRED DRAWINGS

The sprayer shield of the present invention is generally designated in the drawings by the reference numeral 10. The shield is used in conjunction with a sprayer assembly pulled by a tractor or prime mover (not shown). The sprayer assembly includes a tank 12 for herbicides or other liquids to be sprayed on crops, a plurality of sprayer heads 14, and a plurality of fluid lines 16 extending from tank 12 to sprayer heads 14.

Shield 10 includes a forward wall 18, a rearward wall 20, and opposite side walls 22. The top 24 of shield 10 has an opening 26 through which a sprayer head 14 is received. The bottom 28 of shield 10 is open. The forward wall 18, rearward wall 20 and side walls 22 form a hood or shell within which a single sprayer head 14 is mounted. The shell is substantially conical or pyramidal in cross section, with an increasing area from top to bottom. The cross sectional shape of the shell corresponds with the spray pattern of the sprayer head 14.

As shown in the drawings, shield 10 is mounted upon a vertically oriented post 30 attached to an agricultural planter frame 32. More particularly, the mounting means includes a collar 36 matingly received upon post 30, and a set screw 38 for selectively fixing the vertical position of collar 36 upon post 34. A hinge 40 pivotally connects a shield mounting bracket 41 extending from shield 10 to collar 36.

Fixed within shield 10 is a plate 42 having an aperture 44 therein. A terminal end 46 of sprayer head 14 is press fit within aperture 44 so as to orient the sprayer head in the shield 10. Therefore, the spray band emitted by sprayer head 14 coordinates with the major axis "M" of the shield 10. The major axis "M" is sufficiently wide so as to allow the full width of the spray band to be applied to the ground, while the minor axis "m" is sufficient so as to not interfere with the depth of the spray band. Sprayer head 14 is releasably held in place by any convenient means such as clips 47, which are pivotally attached to shield 10 so as to be movable between an open position, as shown in broken lines in FIG. 6, and a closed position, as shown in solid lines in FIG. 6. While the drawings show a single sprayer head 14 mounted in shield 10, it is understood that multiple sprayer heads can be mounted in shield 10.

One of the walls of shield 10 includes a removable door 48 to provide quick and easy access for repair and cleaning of the sprayer head 14. As seen in the drawings, door 48 is a part of rearward wall 20. Door 48 includes keyed slots 50 near the lower edge for receiving studs 52 on rearward wall flanges 53. Door 48 also includes a hole 54 near the top edge for receiving a stud 55, with a cotter pin 56 or the like extending through stud 55 for securing door 48 in position. Alternatively, door 48 can be bolted or hinged to shield 10 to provide access to sprayer head 14.

In use, the position of shield 10 relative to the ground is adjusted by loosening set screw 38 and moving collar 36 and the connected hood upwardly or downwardly along post 30. Preferably, the lower edge of shield 10 is spaced 1-2 inches above the ground. Sprayer head 14 is inserted through the opening 26 in the top 24 of the shield 10 and frictionally fit within the aperture 44 of plate 42. Clips 47 are closed to secure sprayer head 14 in position. The tractor pulls the sprayer assembly with attached shields 10 forwardly over the ground or field. If a shield 10 encounters an obstacle 58 or uneven terrain, the shield will pivot upwardly and rearwardly via hinge 40, and then drop back into its normal position after passing over the obstruction. Therefore, neither shield 10 or sprayer head 4 is damaged.

Also, due to the close tolerance of the shield 10 with the ground, spraying can take place on windy days, since the effect of wind is minimized or eliminated due to the closely spaced position of the shield 10 relative to the ground.

Door 48 can be quickly and easily removed to provide access to the sprayer head 14 for maintenance and/or cleaning. Alternatively, clips 47 can be opened to allow the sprayer head to be quickly and easily removed from the shield without removing shield 10 from the post 30.

It can be seen from the foregoing that the present invention accomplishes at least all of the stated objectives.

What is claimed is:

1. A shield for a sprayer head of a sprayer assembly mounted on a frame for spraying a liquid on the ground, the shield comprising:
   a hood;
   sprayer head mounting means for mounting the sprayer head on the hood so that the liquid is emitted within the hood; and
   hood mounting means for pivotally mounting the hood onto the frame, the means having a single pivot axis.

2. The shield of claim 1 wherein the frame includes a vertically oriented post and the hood mounting means includes means for adjustably mounting the hood on the post such that the space between the hood and the ground is selectively adjustable.

3. The shield of claim 2 wherein the means for adjustably mounting the hood includes a collar slidably received on the post, a bracket extending from the hood, and a hinge interconnecting the collar and bracket.

4. The shield of claim 1 wherein the hood includes a major axis and a minor axis, the sprayer head being mounted on the hood so as to produce a spray pattern coordinating with the major axis of the hood.

5. The shield of claim 1 wherein the hood includes a removable door.

6. The shield of claim 1 wherein the hood has a forward wall, a rearward wall, and opposite side walls, each wall being trapezoidal in shape so that the hood has a rectangular cross section with increasing area from top to bottom.

7. The shield of claim 6 wherein one of the walls is detachably connected to the adjacent walls.

8. The shield of claim 1 wherein the sprayer head mounting means includes a plate fixed within the hood and having an aperture therein for receiving the sprayer head and for locking the head against rotation in the hood.

9. The shield of claim 8 wherein the aperture in the plate is shaped so as to matingly receive the sprayer head.

10. The shield of claim 1 wherein the sprayer head mounting means includes at least one clip movable between an open position for detaching the sprayer head from the hood and a closed position for securing the sprayer head to the hood.

11. In combination with an agricultural sprayer mounted on a frame and having a plurality of sprayer heads for spraying a liquid on the ground, a shield comprising:
   a plurality of shells, each shell having interconnected sidewalls, a substantially closed top end, and an open bottom end;
   each shell having an opening therein for removably receiving a sprayer head such that the sprayer head is enclosed by the shell;
   hinged mean for pivotally mounting each shell onto the frame; and
   means within each shell having an aperture for orienting and locking the sprayer head in position in the shell so as to prevent rotation of the sprayer head relative to the shell.

12. The combination of claim 11 wherein each shell has a cross sectional shape corresponding to a spray pattern emitted by the sprayer head.

13. The combination of claim 11 further comprising releasable fastening means for securing the sprayer head to each shell.

14. The combination of claim 11 wherein each shell includes a removable panel for access to the interior of the shell.

15. The combination of claim 11 further comprising mounting means for selectively adjusting the vertical position of each shell on the frame relative to the ground.

16. A method of spraying a field with herbicides or the like with an agricultural sprayer pulled by a prime mover, the sprayer being mounted on a frame and having a plurality of sprayer heads, the method comprising:
   pivotally securing a plurality of shields to the frame so as to have minimal clearance between each shield and the ground, each shield being pivotally secured about a single pivot axis relative to the frame;

mounting a sprayer head within each shield so that the sprayer head is enclosed, the shield being open at the bottom; and moving the prime mover, and thereby the sprayer forwardly while actuating the sprayer, such that herbicide is sprayed within each shield onto the ground substantially without interference from wind.

17. The method of claim 16 wherein the shields pivot rearwardly and upwardly over encountered obstacles as the prime mover moves forwardly.

18. The method of claim 16 further comprising locking the sprayer head against movement relative to the shield.

19. The method of claim 16 further comprising adjusting the height of each shield relative to the frame.

* * * * *